Sept. 21, 1965 P. A. STOWELL 3,207,625

ELECTROSTATIC RECORD MEDIUM

Filed Sept. 21, 1961

INVENTOR.
PHILIP A. STOWELL

BY E. Walter Ginn

AGENT

United States Patent Office 3,207,625

Patented Sept. 21, 1965

3,207,625

ELECTROSTATIC RECORD MEDIUM

Philip A. Stowell, Paoli, Pa., assignor to Burroughs Corporation, Detroit, Mich., a corporation of Michigan Filed Sept. 21, 1961, Ser. No. 139,719
9 Claims. (Cl. 117—216)

Figure 1:
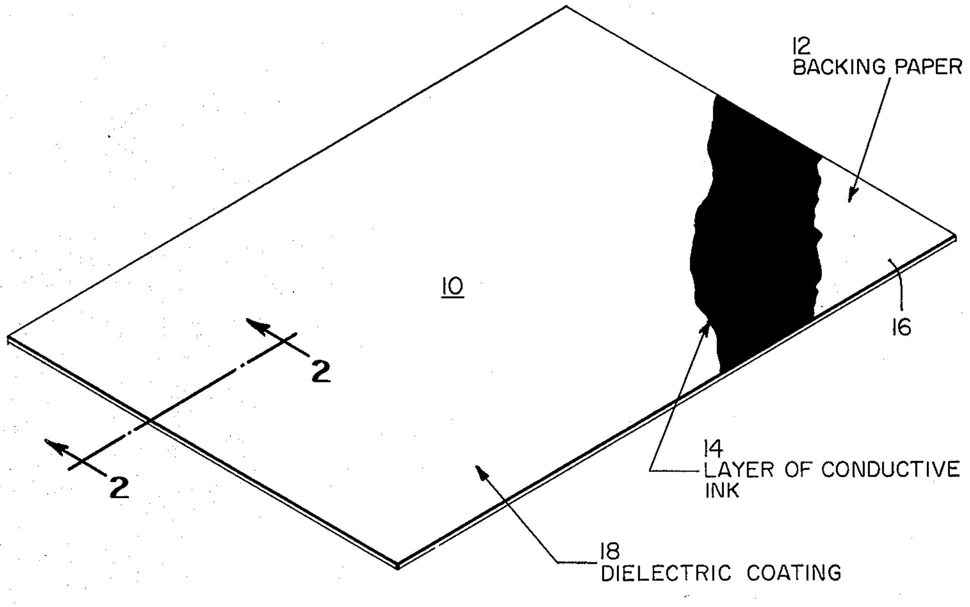

The invention hereinafter described and claimed has to do with electrostatic record mediums more commonly referred to as record paper.

Generally, as taught in the co-pending U.S. patent application entitled "Electrographic Recording Process," Serial No. 714,767, filed February 12, 1958, in the names of Herman Epstein and Robert E. Benn and assigned to the same assignee as the present invention and now forfeited in favor of continuing application Serial No. 255,715, also assigned to the same assignee as the present invention, and in U.S. Patent No. 2,919,170 to Herman Epstein, electrostatic recording—known also as electrostatic printing—is accomplished by the deposition of patterns of electrical charges upon a high dielectric surface of a record medium, which charges are made visible by bringing them into contact with a suitable, usually powdered, electrically conductive ink which adheres to the charged areas, and then, if desired, fixing the ink by subjecting the developed record medium to heat and pressure.

While the details of the recording process are of interest thereto, they are not necessary to a complete understanding of the present invention which has to do only with the physical characteristics of the record medium. Therefore the process will be discussed herein only in the detail necessary for such an understanding.

In the past, as set forth in the above co-pending Epstein-Benn application, a preferred record medium comprised an electrically conductive backing layer having a thin white high dielectric coating on one face thereof. The conductivity of the backing layer is obtained by adding to the pulp during manufacture thereof, a standard commercial grade of carbon black. The white dielectric coating is approximately .0005" thick polyethylene to which has been added substantially 10 to 15% by weight of titanium-dioxide as a whitening pigment. The resulting paper is black on one side, white on the other, electrically conductive, and its electrical conductivity is humidity-stable. While this paper is satisfactory from an operational standpoint, unfortunately, by reason of the black color of the backing layer, its appearance is unattractive.

There have been attempts in the past to fabricate a more presentable paper wherein both sides are of the same color—usually white—and suitable to visibly receive black ink. For example, one such specific attempt was to laminate together a sheet of white paper, a thin sheet of conductive metal foil and a thin sheet of white high dielectric material in that order, with bonding agents under heat and pressure. The attempt was successful to the extent that the so produced record medium would successfully receive and retain latent electrostatic images on the dielectric material, which images were developed in accordance with known procedures. Unfortunately the cost of the record medium was prohibitively high. Then too, it did not prove practicable. The metallic sheet was subject to curling and cracking in use and as its modulus of expansion and contraction was different from that of the other laminations, it was extremely unstable under changing humidity conditions. Another attempt contemplated saturating a white paper with a humectant including an ionizing material, such as a water solution of glycerine plus potassium chloride, then coating one surface with a white high dielectric material. This paper was of good appearance, and under some humidity conditions proved satisfactory, but unfortunately with high humidity it assumed the condition of a wet dish-rag. More importantly, however, under dry condition it lost its conductivity and became non-functional. These conditions, of course, rendered it unsatisfactory for general use.

It is, therefore, an important object of the present invention to provide an improved record medium for electrostatic recording whereby such recording may be presented in an attractive manner commensurate with the appearance of normal business correspondence paper.

More specifically the invention has as an equally important object to provide an electrostatic record medium characterized by its economy of manufacture and its stability and practicability in use.

In accordance with the above objects and first briefly described in its broad aspects, an electrostatic record medium in accordance with the invention comprises a sheet of backing paper having one surface thereof coated with a thin layer of electrically conductive low resistivity ink over which a thin dielectric film of high resistivity is coated.

Figure 2:
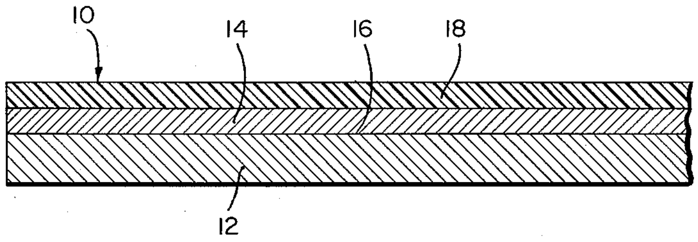

Other objects and attendant advantages of the invention will be readily appreciated as the same becomes better understood by reference to the following description when considered with the accompanying drawings, wherein:

FIG. 1 is a perspective view of a sheet of electrostatic record paper in accordance with the invention, and FIG. 2 is a fragmentary sectional view taken along lines 2—2 of FIG. 1.

Referring now to the details of the preferred form of the invention, it will be seen in the drawing that the paper 10 comprises a backing sheet 12 having a thin unbroken layer 14 of conductive ink on one surface 16 thereof, over which a thin unbroken dielectric film 18 is coated. While the coatings 14 and 18 have been shown and described as "unbroken," it should be understood that this means where the coating is applied—whether over all the surface of the paper, or only in separate designated areas—its continuity is unbroken. While the paper has been illustrated in sheet form it is understood, of course, that preferably it would first be produced as a continuous roll.

The backing paper 12 should be of suitable quality providing a pliable and humidity stable carrier for the conductive ink and the dielectric layer. Most of the well known paper in common use today would fall within this category, and therefore could be used. For example, bleached or unbleached sulfate kraft paper, sulfite, or sulfite-sulfate papers are satisfactory. As manufactured these papers have an inherent slight electrical conductivity suitable for the purposes of the invention. Some slight degree of electrical conductivity of the paper backing is necessary to provide for a flow of electrons—where the dielectric is negatively charged—from the underside of the dielectric coating to the back electrode during recording, in a manner similar to that described in the above mentioned cross-referenced material, and thus prevents the ink from retaining undesirable excessively large charges of such electrons. The paper can be of reasonable thickness but most suitably in the 1 to 6 mil range. One such paper found quite satisfactory and which is preferable is manufactured by Riegel Paper Company, of Milford, New Jersey, under the trademark "Snopaque." It is produced in various weights, but it has been found that the 35 pound weight (per ream, 24 x 36–500) best serves the purposes of the invention. Preferably one side, that is, the side upon which the ink is to be applied, is more highly calendered than the opposite side, which latter provides a rougher surface for feeding rollers to drive against in feeding the paper through the printer, also as described in the above cross-referenced material.

It is understood that some papers manufactured for special purposes—such as for condensers—have extremely low or no electrical conductivity, and these, of course, do not fall within the scope of the present invention.

The conductive ink may be one of the many available on the open market, such as: the ink designated "EC-1554-B" of Acheson Colloids Company, Port Huron, Michigan; "14P152" of Frederick H. Levy Company, Incorporated, Printing Ink Division of Columbian Carbon Company, Philadelphia, Pennsylvania; or "Rotogem Black E84124" or "E84126" of Interchemical Corporation, Printing Ink Division, Philadelphia, Pennsylvania.

Basically, it comprises an ink containing a fluid binding agent and a high percentage of fine particles of conductive material, such as carbon black, imparting to it a low surface resistivity which for best results should not be in excess of 10,000 ohms per square. A preferred ink which has been found satisfactory comprises: 3 kg. styrene butadiene latex, 50% solids, obtained from Koppers Company Incorporated of Pittsburgh, Pennsylvania, and manufactured under the trade name "Dylex K85"; 4 kg. carbon black, 50% solids, obtained from the above mentioned Columbian Carbon Company, and manufactured under the trademark "Aquablak M" 50% solids; and 1600 g. of $H_2O$. An ink so formulated when coated on paper has a surface resistivity of approximately 6,000 ohms per square.

Advantages afforded by the use of conductive ink in the present invention lie in its economy and ease of applicability. Conductive ink, as compared to thin metallic sheets, is extremely economical as to its initial cost. Then too, it may easily and economically be thinly coated on the paper backing sheet. In fact, it may be applied to the paper by an inking roller during manufacture of the paper. Still further, conductive ink so applied eliminates the cracking and curling problems encountered in the use of metallic sheets. It is understood, of course, that the word "ink" as used herein contemplates any electrically conductive materials of similar physical characteristics. That is, an electrically conductive fluid or gel-like material which may be applied as an unbroken film to the surface of the backing paper by ordinary printing or coating techniques, such as by a roller. A quantity equal to one to two pounds per ream (see ream above) has been found be give excellent results.

The dielectric should be one of high volume resistivity. For example, $10^{16}$ ohms-centimeter as pointed out in the above mentioned patent 2,919,170. But this may vary in accordance with the length of time the latent image is to be stored on the record medium before development.

While other high dielectric materials have been found suitable for the coating 18, polystyrene, for example, it is preferable in this preferred form of the invention to utilize pigmented—preferably white—polyethylene, extruded under heat and pressure over the ink as a thin film, using approximately 7 to 15 pounds per ream (see ream above). The white pigment preferably is titanium-dioxide of sufficient quantity (10–25%) to conceal the ink and to afford an attractive appearance to the paper. Such titanium-dioxide may be purchased from "Titanium Pigments Company" of New York City, New York, under the trade name "Titanox RA50." For example, a dielectric comprising a polyethylene pigmented with 15% titanium-dioxide and having a specific gravity of 1.03, cut by adding an amount equal to one third its quantity of clear polyethylene having a specific gravity of 0.916 to 0.918, was used successfully. The pigmented portion was obtained from the Bakelite Division of Union Carbide Corporation of New York City, New York, under the trade name "DFD-3201 White 45," while the clear was "610M" coating grade polyethylene, obtained from Dow Chemical Corporation of Midland, Michigan. It has been found that the dielectric so coated does not noticeably affect the humidity stability of the ink coated paper backing.

As indicated in the aforementioned Epstein and Benn patent application, fixing of the ink on a polyethylene dielectric is accomplished by first subjecting the recording medium to sufficient heat to cause the dielectric to become soft and tacky, and then passing the recording medium between calendering rolls to force the ink particles into the dielectric. All dielectric materials, however, cannot withstand the fixing temperatures.

In some cases, if subjected to such fixing temperatures, certain dielectrics may discolor to such an extent as to make the developed image indiscernable. Heat sensitive dielectrics of that kind do not, of course, fall within the scope of the present invention, and the expression "non-heat sensitive" in the claims is intended to exclude such dielectrics.

There are also certain dielectric materials that are pressure sensitive to such an extent that they mark readily when subjected even to light pressures, such as those from contact with fingernails, for example, which might be encountered in everyday business transactions and in business offices. Such dielectrics, also, are not suited to the purposes of the present invention since the record medium would easily be defaced from ordinary handling. The expression "nonmarkable" in the claims is intended to exclude such dielectrics.

An electrostatic record medium manufactured in accordance with the invention will provide an inexpensive paper of attractive appearance characterized by its stability and practicability for general use.

What is claimed is:

1. An electrostatic record medium comprising:
(a) a pliable backing of paper;
(b) a thin layer of electrically conductive ink coated on one surface thereof;
(c) and a thin layer of opaque, non-heat sensitive, non-markable dielectric material of high volume resistivity capable of receiving and retaining electrical charges, said dielectric material being coated over said conductive ink in a manner sandwiching and concealing said conductive ink coating between said paper backing and said dielectric coating, said dielectric material including a pigment in a quantity sufficient to impart to it said opaqueness, and said dielectric material being capable of having all of said conductive ink remain concealed both during and after electrostatic printing on said record medium.

2. An electrostatic record medium comprising:
(a) a pliable backing of white paper;
(b) a thin layer of electrically conductive ink coated on one surface thereof;
(c) and a thin layer of opaque, non-heat sensitive, non-markable dielectric material capable of receiving and retaining electrical charges, said dielectric material being coated over said conductive ink in a manner sandwiching and concealing said conductive ink coating between said paper backing and said dielectric coating, said dielectric material comprising poylethylene and titanium-dioxide pigment, said pigment being in a quantity sufficient to impart a white appearance to the dielectric coating, and said dielectric material being capable of having all of said conductive ink remain concealed both during and after electrostatic printing on said record medium.

3. A record medium according to claim 2 wherein the quantity of titanium-dioxide is in range of 10 to 25% by weight of said polyethylene.

4. A record medium according to claim 3 wherein the conductivity of said ink is obtained by a high percentage content of electrically conductive particles imparting a surface resistivity not in excess of 10,000 ohms per square.

5. An electrostatic record medium comprising:
(a) a pliable backing af paper having one surface more highly calendered than its other surface;
(b) a thin unbroken layer of electrically conductive ink coated on said one surface thereof;
(c) and a thin unbroken layer of opaque high volume resistivity nonmarkable, non-heat sensitive dielectric material capable of receiving and retaining electrical charges, said high volume resistivity being in the order of $10^{16}$ ohm-centimeters and up, said dielectric material being coated on said conductive ink in a manner sandwiching and concealing said conductive ink coating between said paper backing and said dielectric coating, said dielectric material including a pigment in a quantity sufficient to impart to it said opaqueness.

6. An electrostatic record medium comprising:
(a) a thin pliable backing of white paper;
(b) a thin unbroken layer of electrically conductive carbonaceous ink of low surface resistivity coated on one surface thereof;
(c) and a thin unbroken opaque layer of titanium-dioxide white-pigmented nonmarkable polyethylene dielectric material of high volume resistivity and capable of receiving and retaining electrical charges, said material being coated over said conductive ink in a manner co-operating with said paper to sandwich and conceal said conductive ink coating between said wihte paper and said white dielectric coating, whereby the said record medium has the appearance of normal white paper.

7. An electrostatic record medium in accordance with claim 6 wherein:
(a) the thickness of said paper is in the range of one to six mils;
(b) the said dielectric coating is approximately 7–15 pounds per ream (24 x 36–500);
(c) and the thickness of said ink is less than that of said dielectric coating.

8. An electrostatic record medium according to claim 7 wherein:
(a) said ink has a low surface resistivity not in excess of 10,000 ohms per square;
(b) said dielectric has a high volume resistivity in the order of $10^{16}$ ohm-centimeters and up;
(c) and said layer of ink is coated on said one surface of said backing paper in non-impregnating relation thereto.

9. An electrostatic record medium according to claim 8 wherein said thin pliable backing of white paper is electrically less conductive than said layer of ink, and said dielectric material is non-heat sensitive and capable of having all of said conductive ink remain concealed both during and after electrostatic printing on said record medium.

References Cited by the Examiner

UNITED STATES PATENTS

| | | | |
|---|---|---|---|
| 2,638,422 | 5/53 | Cooley et al. | 117—76 X |
| 2,951,441 | 9/60 | Wolf et al. | 117—218 |
| 3,011,918 | 12/61 | Silvernail et al. | 117—201 |
| 3,012,839 | 12/61 | Epstein et al. | 346—74 |
| 3,044,899 | 7/62 | Canterino. | |
| 3,110,621 | 11/63 | Doggett et al. | 117—201 |

FOREIGN PATENTS

| | | |
|---|---|---|
| 865,394 | 4/61 | Great Britain. |

RICHARD D. NEVIUS, *Primary Examiner.*